US012654372B2

(12) United States Patent
Nakayama

(10) Patent No.: US 12,654,372 B2
(45) Date of Patent: Jun. 16, 2026

(54) SHUT-OFF NOZZLE OF VERTICAL INJECTION MOLDING MACHINE, INJECTION DEVICE, AND VERTICAL INJECTION MOLDING MACHINE

(71) Applicant: THE JAPAN STEEL WORKS, LTD., Tokyo (JP)

(72) Inventor: Kiyotaka Nakayama, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 115 days.

(21) Appl. No.: 18/634,913

(22) Filed: Apr. 13, 2024

(65) Prior Publication Data

US 2024/0351257 A1      Oct. 24, 2024

(30) Foreign Application Priority Data

Apr. 20, 2023     (JP) ................................. 2023-069082

(51) Int. Cl.
  B29C 45/23        (2006.01)
  B29C 45/17        (2006.01)
  B29C 45/72        (2006.01)
(52) U.S. Cl.
  CPC ........ B29C 45/231 (2013.01); B29C 45/1775 (2013.01); B29C 45/72 (2013.01)
(58) Field of Classification Search
  CPC .. B29C 45/231; B29C 2045/235; B29C 45/58
  See application file for complete search history.

(56) References Cited

U.S. PATENT DOCUMENTS 4,886,439 A * 12/1989 Hehl ...................... B29C 45/17
                                                      425/562

FOREIGN PATENT DOCUMENTS

| JP | H03-274125 A | 12/1991 | |
| JP | H07223241 A | * 8/1995 | ......... B29C 45/2806 |
| JP | 2005329655 A | * 12/2005 | |
| JP | 2021-109430 A | 8/2021 | |
| JP | 2021109429 A | * 8/2021 | |

* cited by examiner

*Primary Examiner* — Virak Nguon
(74) *Attorney, Agent, or Firm* — Potomac Law Group, PLLC

(57) ABSTRACT

A shut-off nozzle of a vertical injection molding machine includes: a nozzle portion attached to a lower portion of a vertical injection device and having an injection flow path and a needle hole; a needle valve movably insertable into the needle hole; a cylinder component driving the needle valve; a bracket supporting the cylinder component at a rear end; a fixing device fixing the bracket to a fixing member fixed to the injection device; and a slide position adjustment mechanism adjusting a slide position of the bracket with respect to the fixing member. In a state where the fixing device is released, the bracket is allowed to slide by a predetermined width with respect to the fixing member, allowing the slide position of the bracket to be adjusted by the slide position adjustment mechanism.

14 Claims, 10 Drawing Sheets

SHUT-OFF NOZZLE OF VERTICAL INJECTION MOLDING MACHINE, INJECTION DEVICE, AND VERTICAL INJECTION MOLDING MACHINE

CROSS-REFERENCE TO RELATED APPLICATIONS

This application is based on and claims priority under 35 USC 119 from Japanese Patent Application No. 2023-069082 filed on Apr. 20, 2023, the entire content of which is incorporated herein by reference.

TECHNICAL FIELD

The present disclosure relates to a shut-off nozzle provided in a vertical injection molding machine, an injection device including a shut-off nozzle, a vertical injection molding machine, and an adjustment method for a shut-off nozzle.

BACKGROUND

A shut-off nozzle provided in an injection device of a vertical injection molding machine can prevent so-called drooling by opening and closing a flow path of an injection nozzle through which an injection material flows. There are various types of shut-off nozzles, for example, as described in JPH03-274125A, there is a shut-off nozzle including a nozzle portion and a needle valve provided obliquely to the nozzle portion. This type of shut-off nozzle has an oblique hole, that is, a needle hole, extending from an outer peripheral surface of the nozzle to an injection flow path in the nozzle. A needle valve is inserted into the needle hole so as to be movable forward and backward. When the needle valve is moved forward, the injection flow path is closed, and when the needle valve is moved backward, the injection flow path is opened.

SUMMARY

In this type of shut-off nozzle, the needle valve is driven by a cylinder unit to move forward and backward. A bracket is attached to a predetermined fixing member of the injection device by a bolt, and the cylinder unit is rotatably supported by the bracket at a rear end thereof. Provided that the bracket is attached to the fixing member at an appropriate position, the needle valve is driven by the cylinder unit at an appropriate position. That is, the needle valve is aligned with the needle hole with high accuracy, allowing the needle valve to move forward and backward smoothly to open and close the flow path of the injection nozzle. However, if the position of the bracket with respect to the fixing member is not appropriate, the needle valve deviates from an appropriate position, and smooth driving cannot be performed.

The bracket is fixed to the fixing member by a bolt or the like. In order to adjust the bracket to an appropriate position with respect to the fixing member, the bolt is required to be loosened to adjust the position of the bracket, and then the bolt is tightened again. However, in the vertical injection molding machine, the shut-off nozzle is provided in a lower part of the injection device, and the weight acts on the shut-off nozzle in the vertical direction. Even if the bolt is loosened to release a fixed state of the bracket with respect to the fixing member, it is difficult to adjust the position of the bracket against the weight.

Illustrative aspects of the present disclosure provide a shut-off nozzle capable of appropriately adjusting the position of a needle valve.

Other problems and novel features will become apparent from description of the present description and the accompanying drawings.

The present disclosure is configured as a shut-off nozzle of a vertical injection molding machine. The shut-off nozzle includes a nozzle portion having an injection flow path in an axial direction and an oblique needle hole, a needle valve insertable into the needle hole, a cylinder component configured to drive the needle valve, and a bracket configured to rotatably support the cylinder component at a rear end thereof. According to the present disclosure, the shut-off nozzle includes a fixing device configured to fix the bracket to a fixing member of an injection device, and a slide position adjustment mechanism configured to adjust a slide position of the bracket with respect to the fixing member. In a state where the fixing device is released, the bracket is allowed to slide by a predetermined width with respect to the fixing member, allowing the slide position to be adjusted by the slide position adjustment mechanism.

The present disclosure enables an appropriate adjustment of the position of the needle valve.

DETAILED DESCRIPTION

Figure 1:
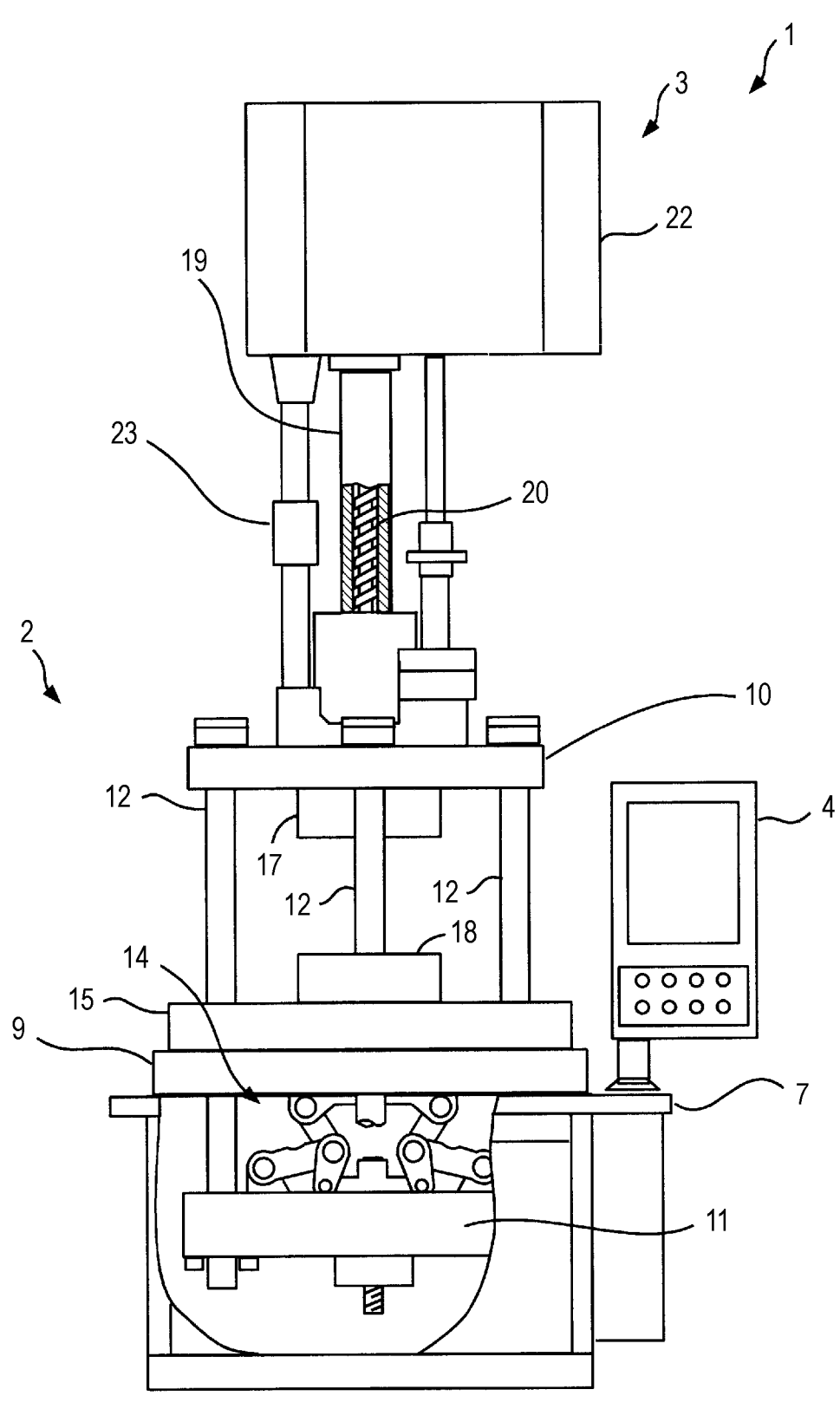
FIG. 1 is a front view showing a vertical injection molding machine according to a first illustrative embodiment.

Hereinafter, specific illustrative embodiments will be described in detail with reference to the drawings. However, the present invention is not limited to the following illustrative embodiment. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

First Illustrative Embodiment

{Vertical Injection Molding Machine}

As shown in FIG. 1, a vertical injection molding machine 1 according to a first illustrative embodiment includes a toggle-type mold clamping device 2 and an injection device 3. The vertical injection molding machine 1 includes a control device 4 configured to control the mold clamping device 2 and the injection device 3.

{Mold Clamping Device}

The mold clamping device 2 is a so-called vertical mold clamping device. The mold clamping device 2 includes a fixed platen 9 fixed to a bed 7, an upper movable platen 10 provided above the fixed platen 9, and a lower movable platen 11 provided in the bed 7. In this illustrative embodiment, the upper movable platen 10 and the lower movable platen 11 are coupled by three tie bars 12, 12, . . . . A toggle mechanism 14 is provided between the lower movable platen 11 and the fixed platen 9. A turntable 15 is provided on the fixed platen 9. An upper mold 17 is provided on the upper movable platen 10, and a lower mold 18 is provided on the turntable 15. When the toggle mechanism 14 is driven, the upper mold 17 and the lower mold 18 are opened and closed.

{Injection Device}

Figure 2:
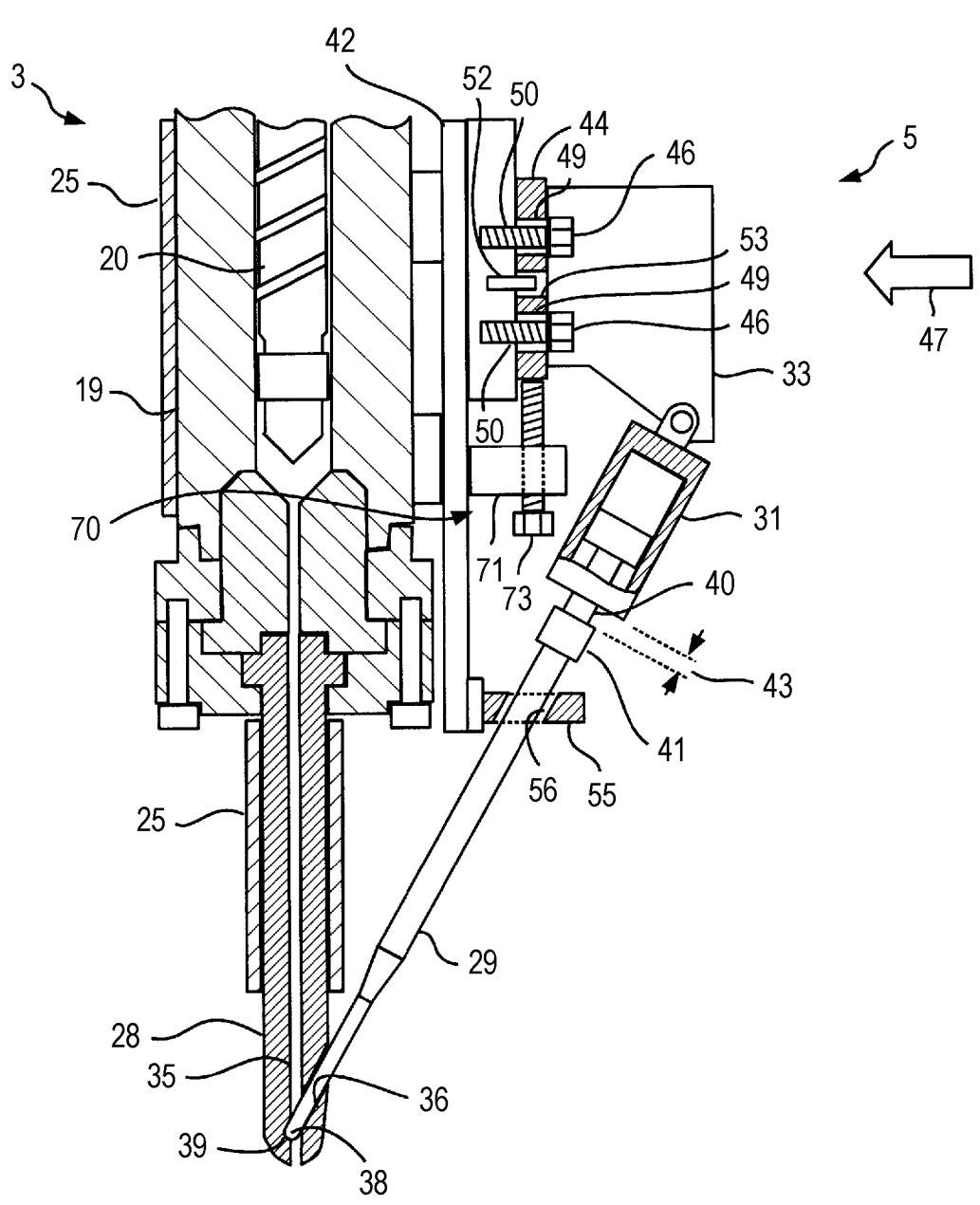
FIG. 2 is a front cross-sectional view showing a shut-off nozzle and a part of an injection device according to the first illustrative embodiment.

The injection device 3 is provided above the upper movable platen 10 of the mold clamping device 2. The injection device 3 includes a heating cylinder 19 that stands substantially vertically, a screw 20 provided in the heating cylinder 19, a screw driving device 22, and an elevating device 23 configured to elevate the entire injection device 3. As will be described in detail later, the heating cylinder 19 includes a shut-off nozzle 5 according to the first illustrative embodiment as shown in FIG. 2. The heating cylinder 19 and the shut-off nozzle 5 are provided with heaters 25, 25, . . . , and the heating cylinder 19 and the shut-off nozzle 5 are heated by the heaters 25, 25, . . . . An injection material is melted and metered by heating with the heaters 25, 25, . . . , and rotating the screw 20. When the screw 20 is driven in an axial direction, the injection material is injected.

{Shut-Off Nozzle}

Figure 4:
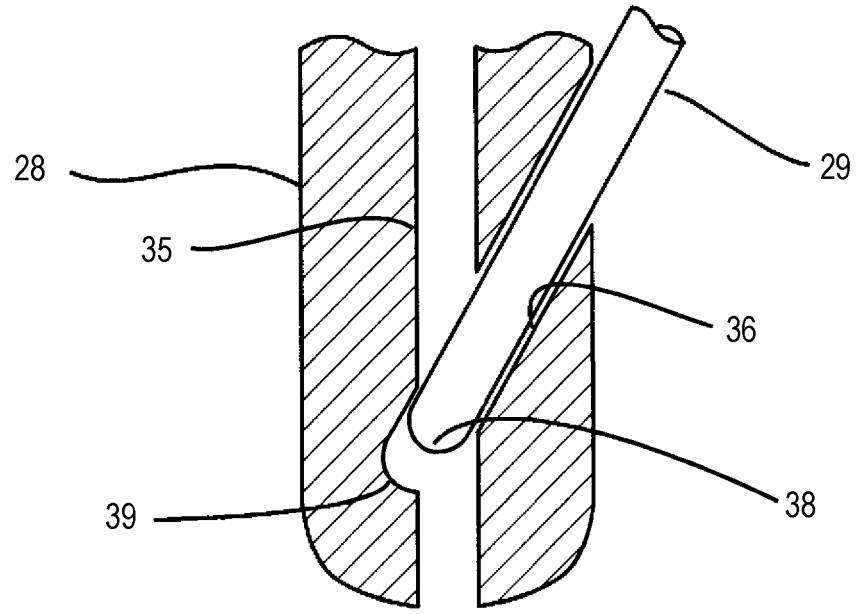
FIG. 4 is a front cross-sectional view showing a part of a nozzle portion and a part of a needle valve of the shut-off nozzle according to the first illustrative embodiment.

As shown in FIG. 2, the shut-off nozzle 5 according to the first illustrative embodiment includes a nozzle portion 28, a needle valve 29, a cylinder unit 31 configured to drive the needle valve 29, and a bracket 33 configured to support the cylinder unit 31. An injection flow path 35 through which the injection material flows is formed in the nozzle portion 28. In this description, the axial direction refers to a direction of an axis of the nozzle portion 28, and the injection flow path 35 is formed in the axial direction. The nozzle portion 28 has a hole that reaches the injection flow path 35 from an outer peripheral surface thereof, that is, a needle hole 36. The needle hole 36 is formed obliquely with respect to the axial direction, and the needle valve 29 is inserted therein so as to be movable forward and backward. As shown in FIG. 4, a tip end portion of the needle hole 36 is formed into a spherical recess 39, and a head portion 38 of the needle valve

29 is formed in a hemispherical shape. When the needle valve 29 is moved forward, the head portion 38 is seated on the recess 39.

The needle valve 29 is configured to be driven by the cylinder unit 31. A rear end of the needle valve 29 is connected to a rod 40 of the cylinder unit 31 by a coupling 41. As described later, in a case where the adjustment of the shut-off nozzle 5 is appropriately performed, when the needle valve 29 is driven to a most forward position, an exposed length 43 of the rod 40 becomes a specified length. By checking the length 43, it is possible to determine whether or not the adjustment of the shut-off nozzle 5 is appropriate.

A rear end of the cylinder unit 31 is rotatably supported by the bracket 33. The bracket 33 is attached to a fixing member 42 fixed to the injection device 3. The fixing member 42 is a relatively long member that is parallel to an axial direction of the heating cylinder 19 of the injection device 3. That is, the fixing member 42 is provided in the injection device 3 and extends in parallel to the axial direction of the injection device 3. A flange portion 44 is formed on the bracket 33, and this flange portion 44 is fixed to the fixing member 42 by fastening bolts 46, 46, . . . which are fixing means.

Figure 3:
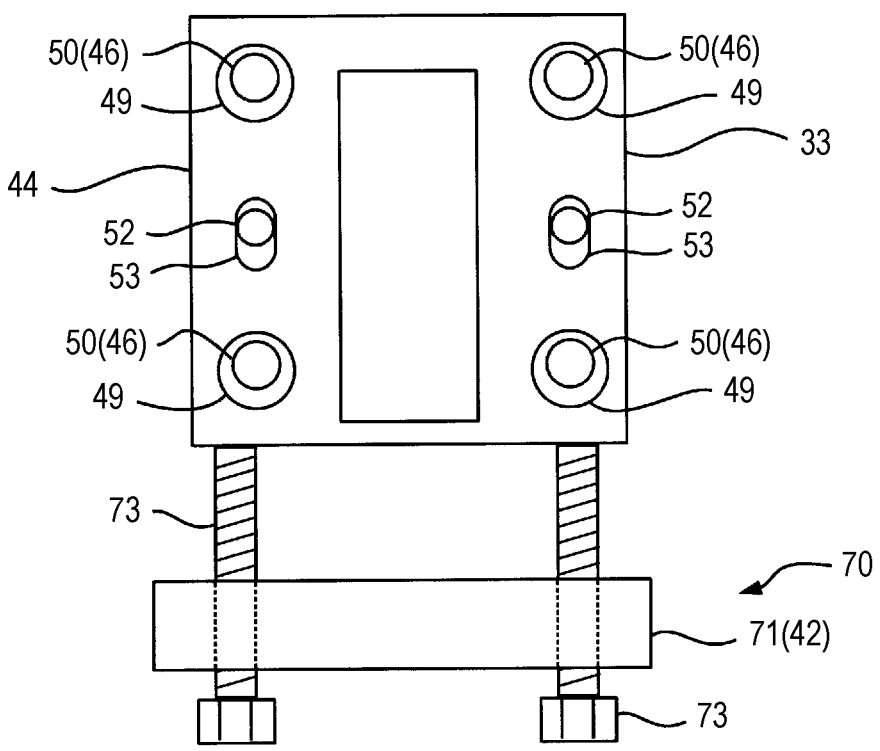
FIG. 3 is a side view showing a bracket and a slide position adjustment mechanism of the shut-off nozzle according to the first illustrative embodiment.

FIG. 3 shows the bracket 33 as viewed in a direction of an arrow 47 shown in FIG. 2. Four bolt holes 49, 49, . . . are formed in the flange portion 44. In FIG. 3, shaft portions 50, 50 of the fastening bolts 46, 46, . . . are shown. Diameters of the bolt holes 49, 49, . . . are larger than diameters of the shaft portions 50, 50. Therefore, when the fastening bolts 46, 46, . . . are loosened, the shaft portions 50, 50 of the fastening bolts 46, 46, . . . become movable within the range of the bolt holes 49, 49, . . . . That is, the bracket 33 can be slid with respect to the fixing member 42 (see FIG. 2) within a certain range.

As shown in FIGS. 2 and 3, in the first illustrative embodiment, knock pins 52, 52 are provided between the fixing member 42 and the bracket 33. The knock pins 52, 52 are embedded in the fixing member 42, and a part of at least one of the knock pins is exposed. As shown in FIG. 3, the bracket 33 has elongated guide holes 53, 53 formed therein. The exposed portions of the knock pins 52, 52 are inserted into the guide holes 53, 53. Accordingly, the knock pins 52, 52 are movable in a longitudinal direction along the guide holes 53, 53. That is, when the fastening bolts 46, 46, . . . are loosened, the bracket 33 is allowed to slightly slide with respect to the fixing member 42 in a state where a slide direction is regulated by the knock pins 52, 52. The slide direction is a direction along the axial direction of the injection device 3, that is, a substantially vertical direction.

As shown in FIG. 2, the fixing member 42 is provided with a guide portion 55 configured to support the needle valve 29 near a rear end thereof. An oblique through hole 56 is formed in the guide portion 55, and the needle valve 29 is inserted into the through hole 56. In the first illustrative embodiment, an inner diameter of the through hole 56 is slightly larger than a diameter of this portion of the needle valve 29, and the needle valve 29 is inserted gently with a slight clearance secured.

{Slide Position Adjustment Means}

In the shut-off nozzle 5 (see FIG. 2), provided that the position of the needle valve 29 is appropriately adjusted, the needle valve 29 is aligned with the needle hole 36 with high accuracy, and the needle valve 29 is movable forward and backward more smoothly by driving the cylinder unit 31. In order to appropriately adjust the position of the needle valve 29, it is necessary to adjust the slide position of the bracket 33 with respect to the fixing member 42. The shut-off nozzle 5 according to the first illustrative embodiment includes slide position adjustment means configured to adjust the slide position of the bracket 33 with respect to the fixing member 42, that is, a slide position adjustment mechanism 70. This will be described.

In the first illustrative embodiment, the slide position adjustment mechanism 70 includes a base portion 71 fixed to the fixing member 42 and a slide position adjustment bolt 73. The base portion 71 is provided near and below the flange portion 44 of the bracket 33. The slide position adjustment bolt 73 is screwed into a female screw formed on the base portion 71 with a head portion facing down, and a tip end portion protrudes from the base portion 71. As shown in FIG. 3, two slide position adjustment bolts 73, 73 are provided in the first illustrative embodiment. However, one slide position adjustment bolt or three or more slide position adjustment bolts may be provided.

The tip end portions of the slide position adjustment bolts 73 and 73 protruding from the base portion 71 are in contact with the flange portion 44 of the bracket 33. Therefore, by loosening the fastening bolts 46, 46 to allow the bracket 33 to slide and by rotating the slide position adjustment bolts 73, 73 to adjust a length of a male screw protruding from the base portion 71, the slide position of the bracket 33 can be adjusted.

{Gauge}

Figure 5:
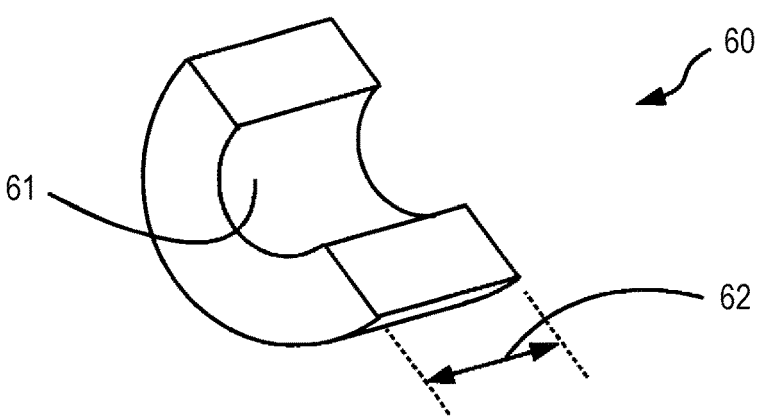
FIG. 5 is a perspective view showing a gauge according to the first illustrative embodiment.

In the adjustment method for the shut-off nozzle 5 (see FIG. 2) according to the first illustrative embodiment described below, in order to check whether the bracket 33 is at an appropriate slide position with respect to the fixing member 42, it is checked whether the length 43 of an exposed portion of the rod 40 is appropriate. FIG. 5 shows a gauge 60 for performing this check. The gauge 60 has a structure like a thick cylinder cut in half. An inner peripheral surface 61 of the gauge 60 has an inner diameter slightly larger than a diameter of the rod 40 (see FIG. 2) and is contactable with the rod 40. A width 62 of the gauge 60 corresponds to the length 43 of the rod 40, so that it can be checked whether the length 43 is an appropriate length.

{Adjustment Method for Shut-Off Nozzle}

Figure 6:
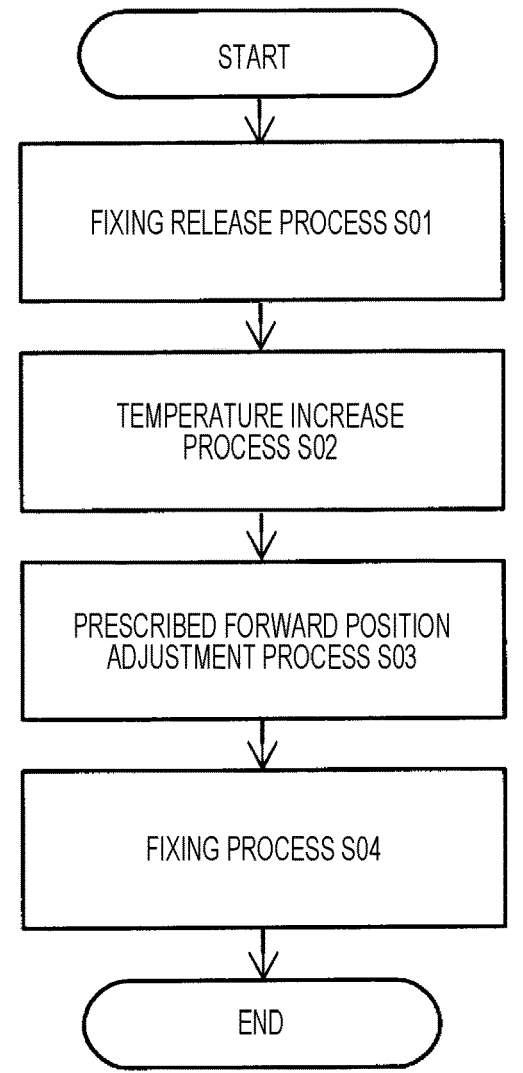
FIG. 6 is a flowchart showing an adjustment method for the shut-off nozzle according to the first illustrative embodiment.
Figure 7A:
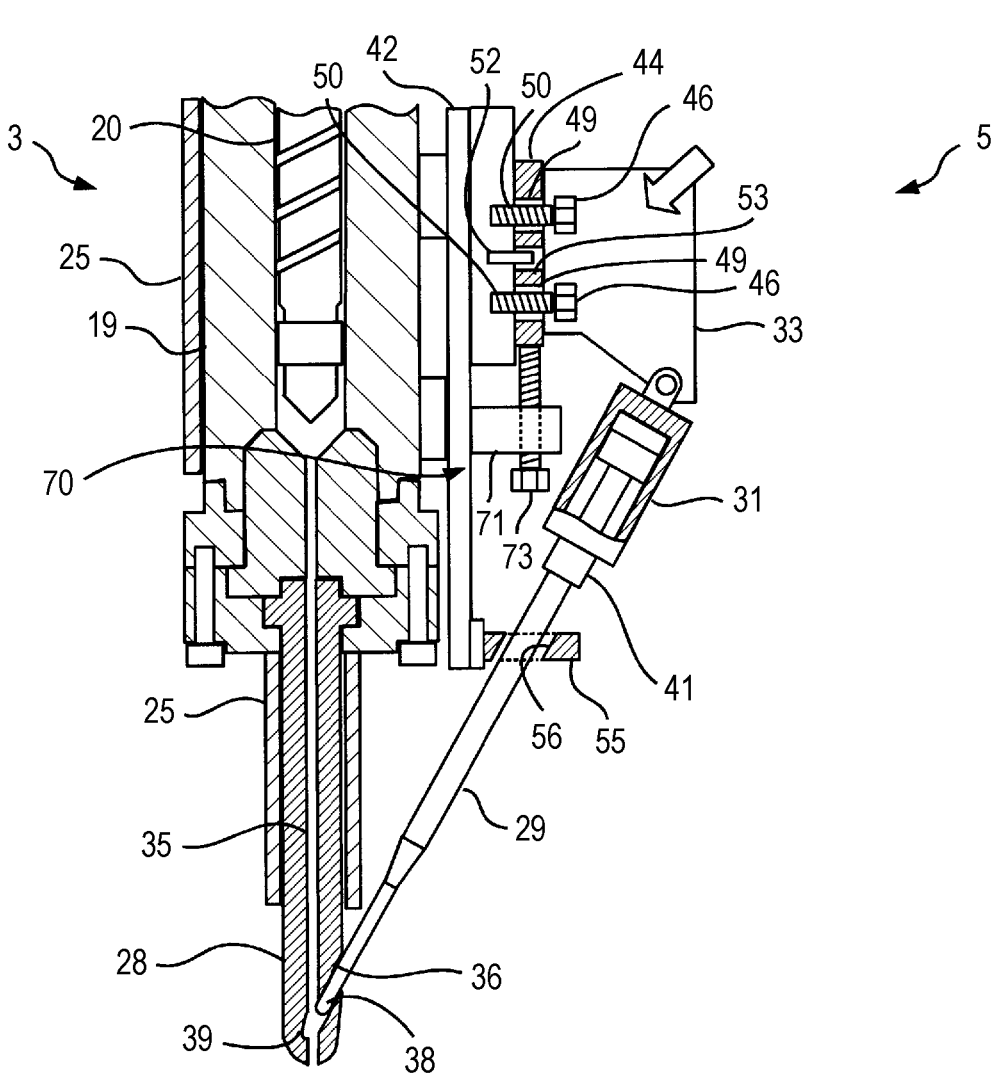
FIG. 7A is a front cross-sectional view of the shut-off nozzle according to the first illustrative embodiment.

An adjustment method for the shut-off nozzle 5 according to the first illustrative embodiment will be described. First, as shown in FIG. 6, a fixing release process (step S01) is performed. That is, as shown in FIG. 7A, the fastening bolts 46, 46 are loosened to release a fixed state of the bracket 33 to the fixing member 42. Then, the bracket 33 is allowed to slide within a predetermined range in a state where the slide direction of the bracket 33 is restricted in a substantially vertical direction by the knock pin 52 and by the elongated guide hole 53. At this time, the bracket 33 falls due to the weight of the bracket 33 and the cylinder unit 31. That is, the bracket 33 slides to a lowermost position with respect to the fixing member 42.

As shown in FIG. 6, a temperature increase process (step S02) is performed. That is, the heating cylinder 19 and the nozzle portion 28 are heated by the heaters 25, 25 (see FIG. 7A). Wait until the heating cylinder 19 and the nozzle portion 28 are heated to an operable state. Then, the heating cylinder 19 and the nozzle portion 28 slightly expand due to the thermal expansion.

Figure 7B:
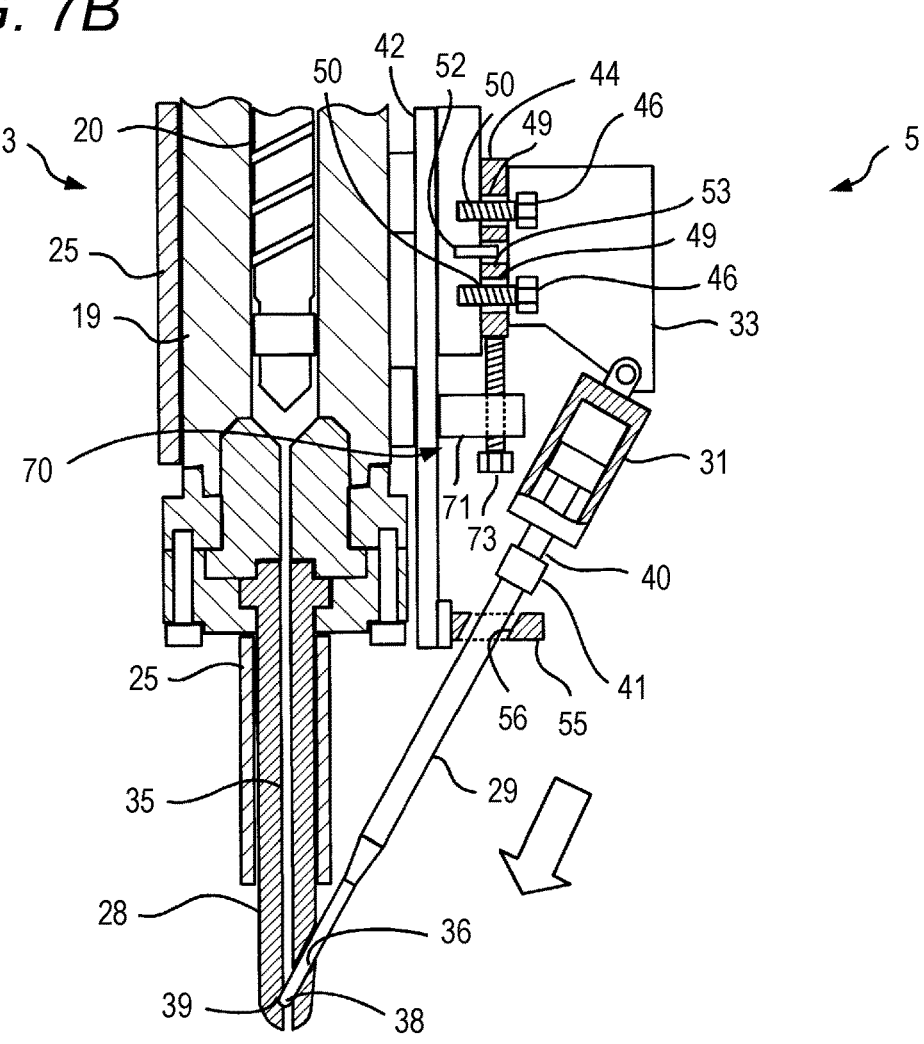
FIG. 7B is a front cross-sectional view of the shut-off nozzle according to the first illustrative embodiment.
Figure 7C:
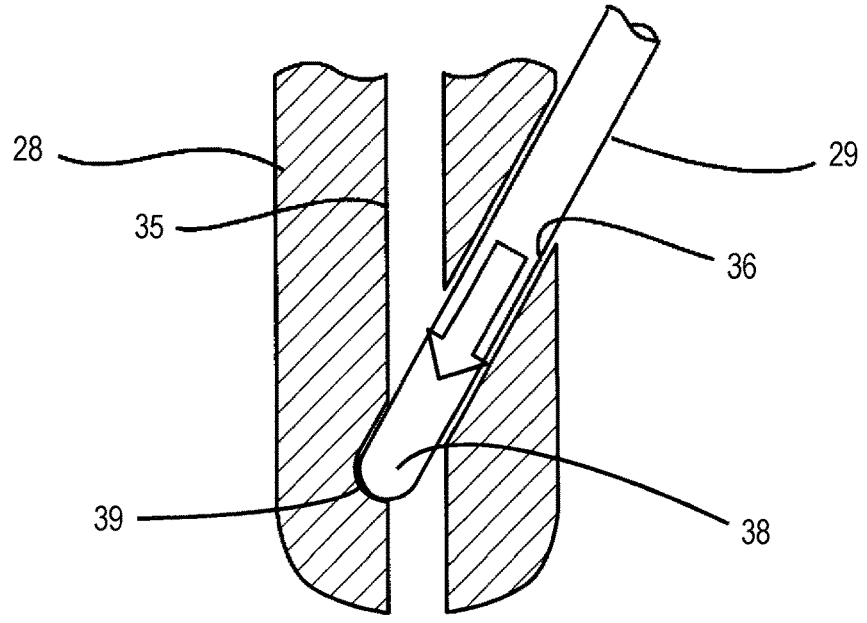
FIG. 7C is a front cross-sectional view showing a part of the nozzle portion and a part of the needle valve of the shut-off nozzle according to the first illustrative embodiment.

After the temperatures of the heating cylinder 19 and the nozzle portion 28 are increased, as shown in FIG. 6, a prescribed forward position adjustment process (step S03) is performed. First, as shown in FIG. 7B, the fluid is supplied to the cylinder unit 31 to drive the needle valve 29 in a forward direction. As shown in FIG. 7C, the head portion 38 of the needle valve 29 is seated on the recess 39 of the needle hole 36 of the nozzle portion 28, and the needle valve 29 stops moving forward. At this time, since the bracket 33 has slid to the lowermost position with respect to the fixing member 42, a length of the forward movement of the needle valve 29 is short. Subsequently, the fluid is supplied to the cylinder unit 31 (see FIG. 7B), and a driving force in the forward direction is applied to the needle valve 29.

Figures 7D, 7E:
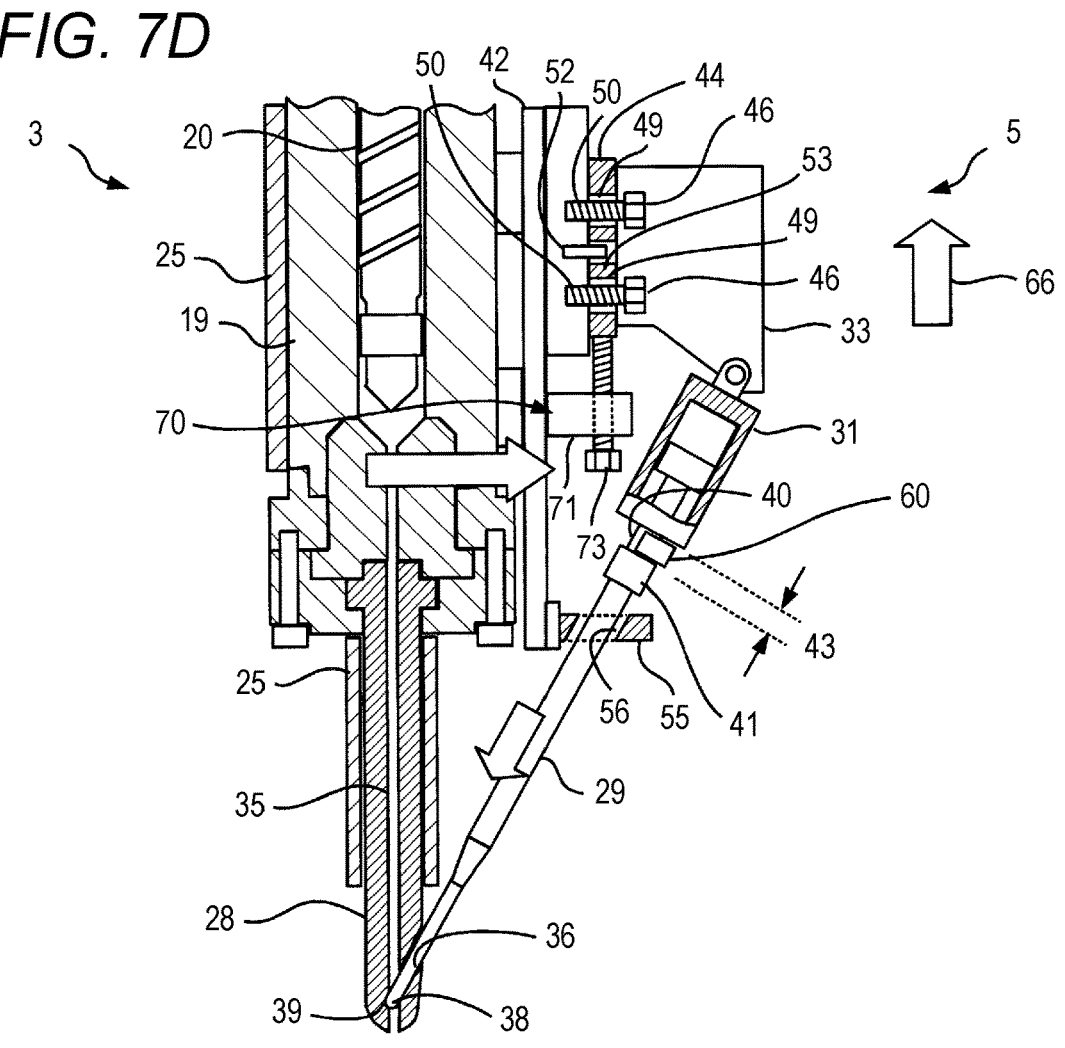
FIG. 7D is a front cross-sectional view of the shut-off nozzle according to the first illustrative embodiment.
FIG. 7E is a front cross-sectional view showing a part of a nozzle portion and a part of a needle valve of the shut-off nozzle according to the first illustrative embodiment.

In this state, as shown in FIG. 7D, the bracket 33 is slid upward by the slide position adjustment mechanism 70. That is, the bracket 33 is slightly lifted upward by the slide position adjustment bolts 73, 73 being rotated slightly. In this illustrative embodiment, two slide position adjustment bolts 73, 73 are provided. Therefore, the two slide position adjustment bolts 73, 73 are alternately rotated little by little to lift the bracket 33 while maintaining the parallel state so that the bracket 33 does not fall down. When the slide position of the bracket 33 is changed upward, the needle valve 29 is automatically pushed out due to a driving force applied to the needle valve 29 in the forward direction. The gauge 60 is inserted into the exposed portion of the rod 40 of the cylinder unit 31, and the length of the exposed portion of the rod 40 is checked. If the gauge 60 cannot be inserted, it is determined that the length of the exposed portion is insufficient, so that the slide position adjustment bolts 73, 73 are rotated further slightly.

Eventually, the length of the exposed portion of the rod 40 becomes an appropriate length, and the gauge 60 is inserted into the exposed portion of the rod 40. Thus, it is determined that the needle valve 29 has reached a specified forward position. In a case where the needle valve 29 is in the specified forward position, as shown in FIG. 7E, the needle valve 29 is aligned with the needle hole 36 with high accuracy. When aligned, the needle valve 29 is substantially coaxial with the needle hole 36. That is, a certain clearance is secured between an outer peripheral surface of the needle valve 29 and an inner peripheral surface of the needle hole 36 in a length direction. In this way, the needle valve 29 is driven smoothly.

FIG. 7E shows the needle valve 29, which is not aligned with the needle hole 36, by a dotted line. In a case where the needle valve 29 is not aligned with the needle hole 36 like this, that is, in a case where the clearance between the outer peripheral surface of the needle valve 29 and the inner peripheral surface of the needle hole 36 is uneven and biased, there are areas where there is strong contact and areas where there is a slightly wide gap. In this case, the resin easily leaks to the outside from areas with a wide gap at the time of metering or injection. There is also a problem that after long-term operation, the parts that are in strong contact wear out, and a product life is shortened. As described above, when the prescribed forward position adjustment process (step S03) is performed, the needle valve 29 can be adjusted to be substantially coaxial with the needle hole 36, and the occurrence of such a problem can be prevented. The prescribed forward position adjustment process (step S03) is completed.

Figure 7F:
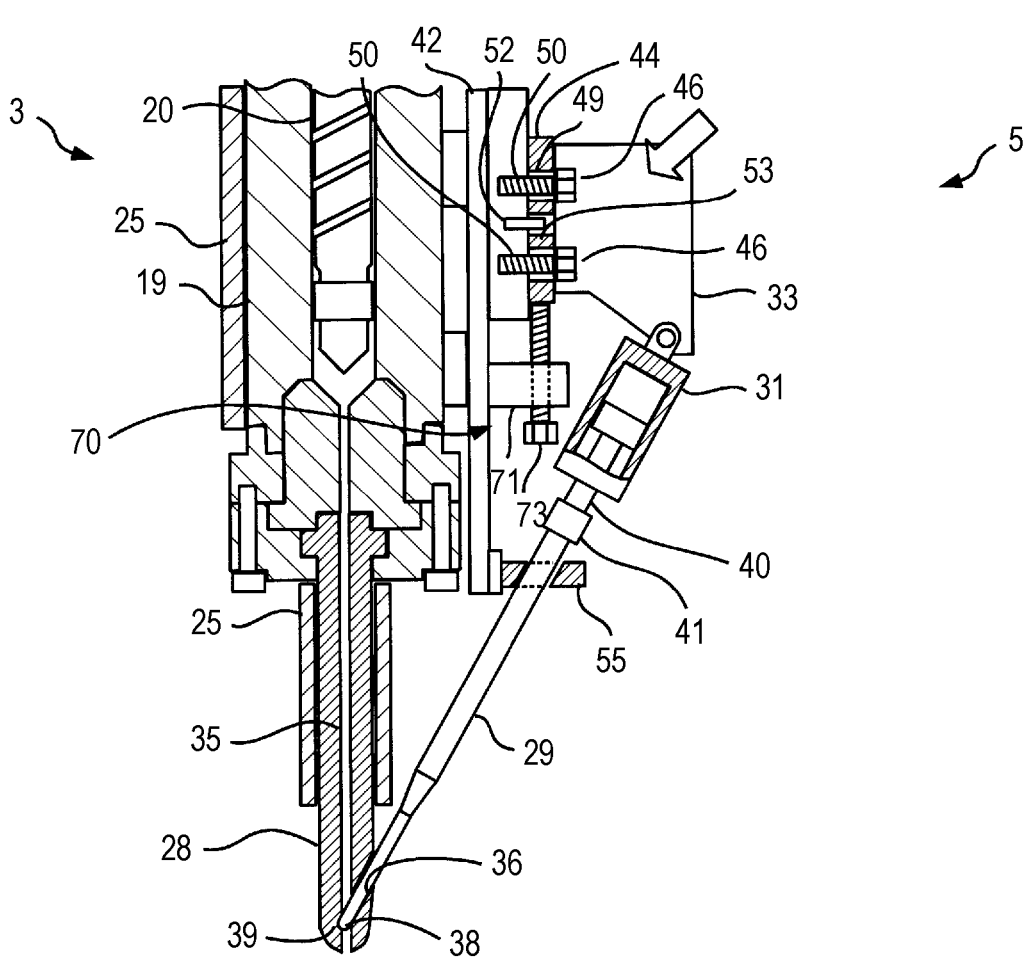
FIG. 7F is a front cross-sectional view of the shut-off nozzle according to the first illustrative embodiment.

As shown in FIG. 6, a fixing process (step S04) is performed. That is, as shown in FIG. 7F, the fastening bolts 46, 46 are fastened. Thus, the bracket 33 is fixed to the fixing member 42. The adjustment method for the shut-off nozzle 5 is completed.

Second Illustrative Embodiment

{Vertical Injection Molding Machine}

A second illustrative embodiment will be described. In the vertical injection molding machine 1 according to the second illustrative embodiment, the mold clamping device 2, the injection device 3, and the control device 4 are configured similarly to the mold clamping device 2, the injection device 3, and the control device 4 in the vertical injection molding machine 1 according to the first illustrative embodiment shown in FIG. 1. Therefore, the description thereof will be omitted.

{Shut-Off Nozzle}

Figure 8A:
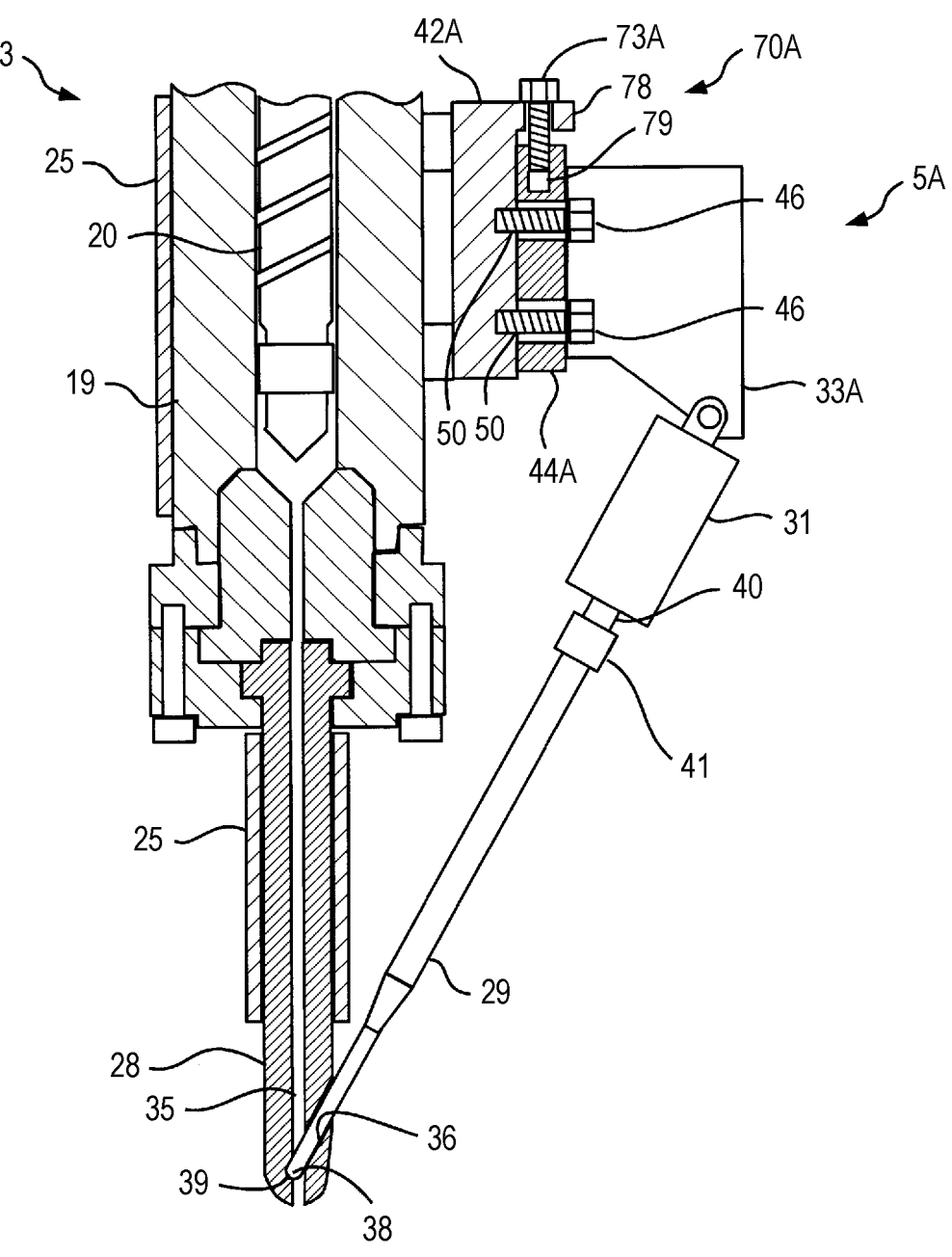
FIG. 8A is a front cross-sectional view of a shut-off nozzle according to a second illustrative embodiment.

A shut-off nozzle 5A according to the second illustrative embodiment is shown in FIG. 8A. The shut-off nozzle 5A according to the second illustrative embodiment is different from the first illustrative embodiment in the structure of a fixing member 42A, the structure of a bracket 33A, and a slide position adjustment mechanism 70A. The guide portion 55 (see FIG. 2) provided in the first illustrative embodiment is not provided in the second illustrative embodiment. Other members and structures of the shut-off nozzle 5A according to the second illustrative embodiment are configured in the same manner as those of the shut-off nozzle 5 according to the first illustrative embodiment shown in FIG. 2, and description thereof will be omitted.

In the shut-off nozzle 5A according to the second illustrative embodiment, the fixing member 42A is fixed to a predetermined part of the heating cylinder 19, and does not have a structure extending in the axial direction of the injection device 3. This is because, as described above, the guide portion 55 (see FIG. 2) provided in the first illustrative embodiment is not provided, and therefore, there is no need for the fixing member 42A to have a structure extending in the axial direction of the injection device 3 in the second illustrative embodiment. The bracket 33A according to the second illustrative embodiment is provided on the fixing member 42A.

Figure 8B:
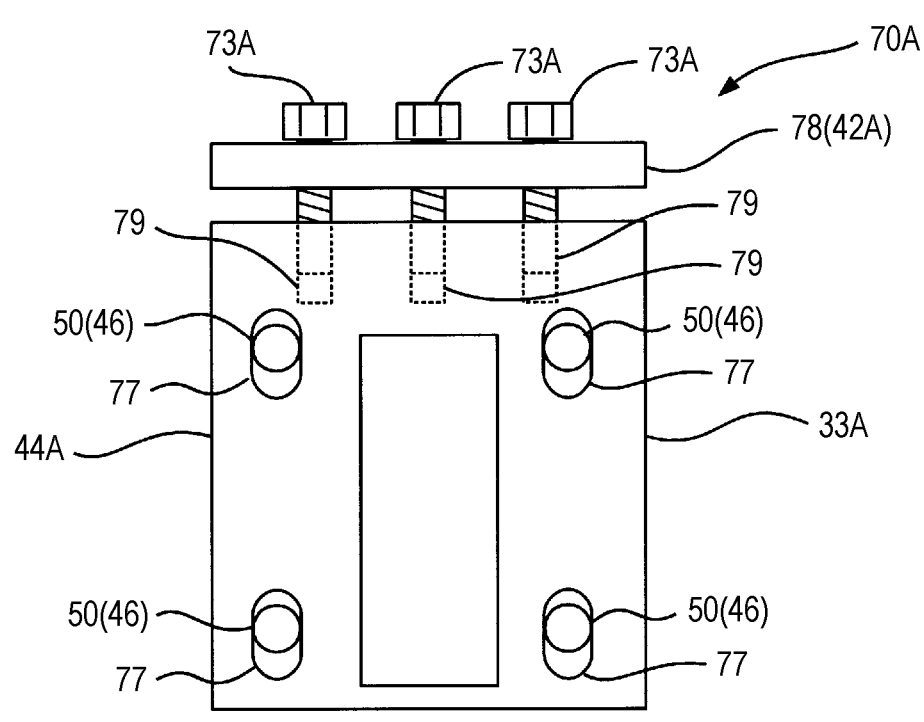
FIG. 8B is a side view showing a bracket and a slide position adjustment mechanism of the shut-off nozzle.

The bracket 33A according to the second illustrative embodiment is also fixed to the fixing member 42A by the fastening bolts 46, 46, . . . as in the first illustrative embodiment, but is different from those in the first illustrative embodiment in several points. FIG. 8B shows the bracket 33A viewed from a lateral side. A flange portion 44A of the bracket 33A has bolt holes 77, 77, . . . into which the shaft portions 50, 50, . . . of the fastening bolts 46, 46, . . . are inserted. In the second illustrative embodiment, the bolt holes 77, 77, . . . are long holes. Therefore, the bolt holes 77, 77, . . . allow the shaft portions 50, 50, . . . of the fastening bolts 46, 46, . . . to move only in the vertical direction. In the second illustrative embodiment, although the knock pins 52 and 52 (see FIGS. 2 and 3) provided in the first illustrative embodiment are not provided, the bracket 33A is allowed to slide in the vertical direction as in the first illustrative embodiment.

{Slide Position Adjustment Means}

The slide position adjustment mechanism 70A of the shut-off nozzle 5A according to the second illustrative embodiment will be described. As shown in FIG. 8A, the slide position adjustment mechanism 70A includes a suspending portion 78 fixed to the fixing member 42 and a slide position adjustment bolt 73A. The suspending portion 78 is provided in the vicinity of and above the flange portion 44A of the bracket 33A. As shown in FIGS. 8A and 8B, head portions of the slide position adjustment bolts 73A, 73A, . . . are placed on the suspending portion 78, and male screws thereof are screwed into female screws 79 formed in the flange portion 44A of the bracket 33A. That is, the bracket 33A is suspended by the slide position adjustment bolts 73A, 73A, . . . .

Therefore, when the slide position adjustment bolts 73A, 73A, . . . are rotated to adjust a length of the male screw screwed into the female screw 79, 79, . . . , the suspending position of the bracket 33A changes. That is, the slide position of the bracket 33A can be adjusted. As shown in FIG. 8B in the second illustrative embodiment, there are three slide position adjustment bolts 73A, 73A, . . . . However, one, two, or four or more slide position adjustment bolts may be provided.

{Adjustment Method for Shut-Off Nozzle}

The adjustment method for the shut-off nozzle 5A according to the second illustrative embodiment can also be performed in the same manner as the adjustment method for the shut-off nozzle 5 according to the first illustrative embodiment. That is, as shown in FIG. 6, the fixing release process (step S01), the temperature increase process (step S02), and the prescribed forward position adjustment process (step S03) are sequentially performed, and the fixing process (step S04) may be finally performed. In the prescribed forward position adjustment process (step S03), it is necessary to adjust the slide position of the bracket 33A by supplying the fluid to the cylinder unit 31 (see FIG. 8A) to apply the driving force in the forward direction to the needle valve 29. In the second illustrative embodiment, as described above, the slide position adjustment bolts 73A, 73A, . . . are rotated little by little to adjust the suspending position of the bracket 33A. Accordingly, the slide position of the bracket 33A can be adjusted.

Although the invention made by the present inventors is specifically described based on the illustrative embodiment, it is needless to say that the present invention is not limited to the illustrative embodiments described above, and various modifications can be made without departing from the scope of the invention. The plurality of examples described above may be appropriately combined.

What is claimed is:

1. A shut-off nozzle of a vertical injection molding machine, the shut-off nozzle comprising:

a nozzle portion attached to a lower portion of a vertical injection device, the nozzle portion having an injection flow path in an axial direction formed therein and a needle hole reaching the injection flow path from an outer peripheral surface of the nozzle portion;

a needle valve movably insertable into the needle hole to open and close the injection flow path;

a cylinder component configured to drive the needle valve in a moving direction;

a bracket configured to rotatably support the cylinder component at a rear end;

a fixing device configured to fix the bracket to a fixing member fixed to the injection device; and a slide position adjustment mechanism configured to adjust a slide position of the bracket with respect to the fixing member, wherein in a state where the fixing device is released, the bracket is allowed to slide by a predetermined width with respect to the fixing member, allowing the slide position of the bracket to be adjusted by the slide position adjustment mechanism, wherein the slide position adjustment mechanism includes:

a base portion fixed to the fixing member; and one or a plurality of slide position adjustment bolts each having a head portion and a tip end portion, and wherein the slide position adjustment bolt is screwed into a female screw formed in the base portion with the head portion facing downward and the tip end portion protruding from the base portion to press against an end of the bracket, allowing the slide position of the bracket to be adjusted by adjusting a length of a male screw protruding from the base portion.

2. The shut-off nozzle according to claim 1,
wherein the fixing device is a fastening bolt,
wherein a fastening bolt hole through which a shaft portion of the fastening bolt passes is formed in the bracket, and
wherein the fastening bolt hole is formed as a hole having a diameter larger than a diameter of the shaft portion or as an elongated hole.

3. The shut-off nozzle according to claim 1,
wherein a knock pin is fixed to the fixing member,
wherein the bracket has an elongated guide hole into which the knock pin is inserted, and
wherein in a case where the fixing device is released, a slide direction of the bracket is regulated in a vertical direction by the knock pin.

4. The shut-off nozzle according to claim 1, further comprising:
an adjustment confirmation gauge,
wherein the adjustment confirmation gauge is configured to determine whether the needle valve reaches a prescribed forward position when the cylinder component is driven.

5. The shut-off nozzle according to claim 4, wherein the adjustment confirmation gauge is inserted into an exposed portion of a rod protruding from the cylinder component and is configured to determine a protruding length.

6. An injection device, comprising:
a heating cylinder provided vertically;
a screw provided in the heating cylinder; and
a shut-off nozzle provided in a lower part of the heating cylinder, the shut-off nozzle including:
a nozzle portion having an injection flow path in an axial direction formed therein and a needle hole reaching the injection flow path from an outer peripheral surface of the nozzle portion;
a needle valve movably inserted into the needle hole to open and close the injection flow path;
a cylinder component configured to drive the needle valve in a moving direction;
a bracket configured to rotatably support the cylinder component at a rear end;
a fixing device configured to fix the bracket to a fixing member fixed to the heating cylinder; and
a slide position adjustment mechanism configured to adjust a slide position of the bracket with respect to the fixing member,
wherein in a state where the fixing device is released, the bracket is allowed to slide by a predetermined width with respect to the fixing member, allowing the slide position of the bracket to be adjusted by the slide position adjustment mechanism,
wherein the slide position adjustment mechanism includes:
a base portion fixed to the fixing member; and
one or a plurality of slide position adjustment bolts each having a head portion and a tip end portion, and
wherein the slide position adjustment bolt is screwed into a female screw formed on the base portion with the head portion facing downward and the tip end portion protruding from the base portion to press against an end of the bracket, allowing the slide position of the bracket to be adjusted by adjusting a length of a male screw protruding from the base portion.

7. The injection device according to claim 6,
wherein the fixing device includes a fastening bolt,
wherein a fastening bolt hole through which a shaft portion of the fastening bolt passes is formed in the bracket, and
wherein the fastening bolt hole is formed as a hole having a diameter larger than a diameter of the shaft portion or as an elongated hole.

8. The injection device according to claim 6,
wherein a knock pin is fixed to the fixing member,
wherein the bracket has an elongated guide hole into which the knock pin is inserted, and
wherein in a case where the fixing device is released, a slide direction of the bracket is regulated in a vertical direction by the knock pin.

9. A vertical injection molding machine comprising:
a vertical mold clamping device configured to clamp a mold,
a vertical injection device configured to inject an injection material, the injection device including:
a heating cylinder provided vertically;
a screw provided in the heating cylinder; and
a shut-off nozzle provided in a lower part of the heating cylinder, the shut-off nozzle including:
a nozzle portion having an injection flow path in an axial direction formed therein and a needle hole reaching the injection flow path from an outer peripheral surface of the nozzle portion;
a needle valve movably insertable into the needle hole to open and close the injection flow path;
a cylinder component configured to drive the needle valve in a moving direction;
a bracket configured to rotatably support the cylinder component at a rear end;
a fixing device configured to fix the bracket to a fixing member fixed to the injection device; and
a slide position adjustment mechanism configured to adjust a slide position of the bracket with respect to the fixing member,
wherein the bracket is allowed to slide by a predetermined width with respect to the fixing member in a state where the fixing device is released, allowing the slide position of the bracket to be adjusted by the slide position adjustment mechanism,
wherein the slide position adjustment mechanism includes:
a base portion fixed to the fixing member; and
one or a plurality of slide position adjustment bolts each having a head portion and a tip end portion, and
wherein the slide position adjustment bolt is screwed into a female screw formed on the base portion with the head portion facing downward and the tip end portion protruding from the base portion to press against an end of the bracket, allowing the slide position of the bracket to be adjusted by adjusting a length of a male screw protruding from the base portion.

10. The vertical injection molding machine according to claim 9,
wherein the fixing device includes a fastening bolt,
wherein a fastening bolt hole through which a shaft portion of the fastening bolt passes is formed in the bracket, and wherein the fastening bolt hole is formed as a hole having a diameter larger than a diameter of the shaft portion or as an elongated hole.

11. The vertical injection molding machine according to claim 9, wherein a knock pin is fixed to the fixing member, wherein the bracket has an elongated guide hole into which the knock pin is inserted, and wherein in a case where the fixing device is released, a slide direction of the bracket is regulated in a vertical direction by the knock pin.

12. An adjustment method for a shut-off nozzle of a vertical injection molding machine, the shut-off nozzle including:

a nozzle portion attached to a lower part of a vertical injection device of the vertical injection molding machine, the nozzle portion having an injection flow path in an axial direction formed therein and a needle hole reaching the injection flow path from an outer peripheral surface of the nozzle portion;

a needle valve movably inserted into the needle hole to open and close the injection flow path;

a cylinder component configured to drive the needle valve in a moving direction;

a bracket configured to rotatably support the cylinder component at a rear end, a fixing device configured to fix the bracket to a fixing member fixed to the injection device; and a slide position adjustment mechanism configured to adjust a slide position of the bracket with respect to the fixing member, the adjustment method comprising:

releasing the fixing device to allow the bracket to slide by a predetermined width with respect to the fixing member;

heating the injection device and the nozzle portion by a heater;

adjusting the slide position of the bracket by the slide position adjustment mechanism to bring the needle valve to reach a prescribed forward position in a state where a fluid is supplied to the cylinder component to apply a driving force in a forward direction to the needle valve; and fixing the bracket to the fixing member by the fixing device, wherein the slide position adjustment mechanism includes:

a base portion fixed to the fixing member; and one or a plurality of slide position adjustment bolts each having a head portion and a tip end portion, and wherein the slide position adjustment bolt is screwed into a female screw formed on the base portion with the head portion facing downward and the tip end portion protruding from the base portion to press against an end of the bracket, allowing the slide position of the bracket to be adjusted by adjusting a length of a male screw protruding from the base portion.

13. The adjustment method for a shut-off nozzle according to claim 12, wherein the adjusting of the slide position includes determining whether the needle valve reaches a prescribed forward position by an adjustment confirmation gauge, the adjustment confirmation gauge being inserted into an exposed portion of a rod protruding from the cylinder component and configured to determine a protruding length.

14. The adjustment method for a shut-off nozzle according to claim 12, wherein the fixing device is a fastening bolt, and the releasing of the fixing device is to loosen the fastening bolt, wherein a fastening bolt hole through which a shaft portion of the fastening bolt passes is formed in the bracket, and wherein the fastening bolt hole is formed as a hole having a diameter larger than a diameter of the shaft portion or as an elongated hole.

* * * * *